(12) United States Patent
Lai et al.

(10) Patent No.: US 11,879,756 B2
(45) Date of Patent: Jan. 23, 2024

(54) POSITION DETECTION MODULE AND POSITION DETECTION SYSTEM THEREOF

(71) Applicant: TECHMAN ROBOT INC., Taoyuan (TW)

(72) Inventors: Chun-Wen Lai, Taoyuan (TW); Chih-Jan Kao, Taoyuan (TW); Yen-Chou Lu, Taoyuan (TW)

(73) Assignee: Techman Robot Inc., Taoyuan (TW)

( * ) Notice: Subject to any disclaimer, the term of this patent is extended or adjusted under 35 U.S.C. 154(b) by 133 days.

(21) Appl. No.: 17/705,141

(22) Filed: Mar. 25, 2022

(65) Prior Publication Data
US 2023/0058133 A1 Feb. 23, 2023

(30) Foreign Application Priority Data
Aug. 19, 2021 (TW) ................................. 110130778

(51) Int. Cl.
*G01D 5/34* (2006.01)
*G01D 5/347* (2006.01)

(52) U.S. Cl.
CPC ................................. *G01D 5/3473* (2013.01)

(58) Field of Classification Search
CPC .. G01D 5/347; G01D 5/34715; G01D 5/3473; G01D 5/34746
See application file for complete search history.

(56) References Cited

U.S. PATENT DOCUMENTS

| 7,244,929 B2* | 7/2007 | Rodi ................... G01D 5/2454 341/11 |
| 2012/0136625 A1* | 5/2012 | Joachimsthaler .... G01D 5/2457 702/150 |

* cited by examiner

*Primary Examiner* — Kevin K Pyo
(74) *Attorney, Agent, or Firm* — Innovation Counsel LLP (57) ABSTRACT

A position detection module and a position detection system thereof are provided. The position detection module includes a first output port, a second output port, a third output port and a fourth output port. The first output port outputs a first detection signal, the second output port outputs a first position signal, the third output port outputs a second detection signal, and the fourth output port outputs a second position signal. Thus, the design of two sets of detection signals and position signals enables the position detection module to be fault-tolerant for meeting the requirements of safe dual-channel.

9 Claims, 6 Drawing Sheets

POSITION DETECTION MODULE AND POSITION DETECTION SYSTEM THEREOF

This application claims the benefit of Taiwan application Serial No. 110130778, filed Aug. 19, 2021, the subject matter of which is incorporated herein by reference.

BACKGROUND OF THE INVENTION

Field of the Invention

The invention relates in general to a position detection module and a position detection system thereof, and more particularly to a safe dual-channel position detection module and a position detection system thereof.

Description of the Related Art

An ordinary robotic arm has multiple axial arms and multiple joints. The first axial arm links to the first joint; the second axial arm links to the second joint; by the same analogy, the sixth axial arm links to the sixth joint. Each joint controls the motion of respective axial arm, such that the motion of the robotic arm has six degrees of freedom. When a joint controls an axial arm to move, a position detection module detects the motion position of the axial arm and reports the position information of the axial arm back to the controller. The controller generates a control signal according to the position information, then transmits the control signal to each joint, such that each joint can drive respective axial arm to a designated position according to the control signal.

Since an ordinary position detection module is not provided with fault-tolerant design, when the position detection module breaks down, the power of the robotic arm will immediately be cut off. Consequently, the robotic arm will stop abruptly, the schedule of the production line will be delayed, and the lifespan of peripheral elements will be affected. To resolve the above problems, the present invention provides a fault-tolerant position detection module capable of prolonging the lifespan of peripheral elements and maintaining the productivity of the production line.

SUMMARY OF THE INVENTION

The invention is directed to a position detection module and a position detection system thereof provided with a dynamic self-monitoring function. When abnormality occurs to a part of the position detection module, maintenance can be performed after the production line stops operation.

According to one embodiment of the present invention, a position detection module and a position detection system thereof are provided. The position detection module includes a first output port, a second output port, a third output port and a fourth output port. The first output port outputs a first detection signal, the second output port outputs a first position signal, the third output port outputs a second detection signal, and the fourth output port outputs a second position signal. Thus, the design of two sets of detection signals and position signals enables the position detection module to be fault-tolerant for meeting the requirements of safe dual-channel.

Moreover, the position detection system includes a position detection module and a micro-processor. The position detection module is coupled to the micro-processor. The micro-processor includes a first signal processing module, a second signal processing module, a first input pin and a second input pin. The first signal processing module and the second signal processing module receive and process the first position signal and the second position signal, respectively. The first input pin and the second input pin receive the first detection signal and the second detection signal, respectively.

The micro-processor includes a read control module coupled to the position detection module for controlling the position detection module to output the detection signals indicating different operation states.

The above and other aspects of the invention will become better understood with regard to the following detailed description but non-limiting embodiment(s). The following description is made with reference to the accompanying drawings.

DETAILED DESCRIPTION OF THE INVENTION

The technical methods adopted to achieve the above objects of the present invention and the consequent effects are disclosed in a number of embodiments below with reference to the accompanying drawings.

Figure 1:
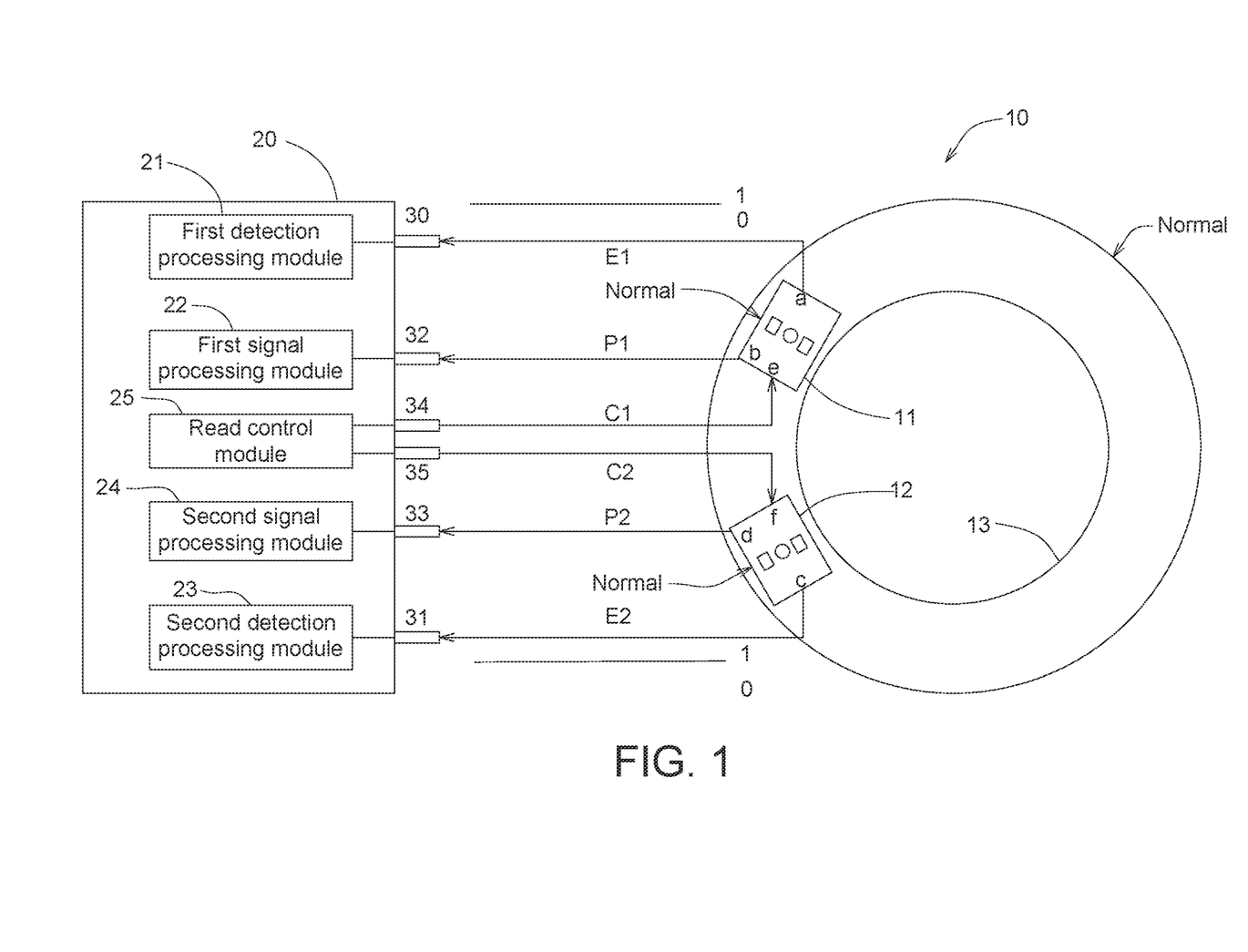
FIG. 1 is a schematic diagram of a position detection module and a position detection system thereof according to the present invention.

Referring to FIG. 1, a schematic diagram of a position detection module and a position detection system thereof according to the present invention is shown. As indicated in the FIG. 1, the position detection system includes a position detection module 10 and a micro-processor 20. The position detection module 10 is coupled to the micro-processor 20 for transmitting several types of signals. The position detection module 10 of FIG. 1 has four output ports a, b, c, d and two input ports e and f. However, the number of output ports and the number of input ports are for exemplary purpose only, not for limiting the implementation of the present invention. The first output port a of the position detection module 10 outputs a first detection signal E1 the second output port b outputs a first position signal P1; the third output port c outputs a second detection signal E2; the fourth output port d outputs a second position signal P2. Thus, the design of two sets of detection signals E1 and E2 and position signals P1 and P2 enables the position detection module 10 to be fault-tolerant for meeting the requirements of safe dual-channel. If one set of detection signals (such as detection signal E1) of the position detection module 10 indicates an abnormal result, that is, a part of the position detection module 10 is in an abnormal state, and the other set of detection signals (such as detection signal E2) of the position detection module 10 indicates a normal result, the position detection module 10 still can continue with detection according to the position signal P2, and there is no need to stop the operation of the production line immediately. The maintenance of abnormality can wait until the operation of the production line stops.

The position detection module 10 includes a first position detector 11, a second position detector 12 and an encoding disc 13. The first position detector 11 includes the first output port a and the second output port b configured to output the first detection signal E1 and the first position signal P1, respectively. The second position detector 12 includes the third output port c and the fourth output port d configured to output the second detection signal E2 and the second position signal P2, respectively. As indicated in the diagram, the first position detector 11 and the second position detector 12 are disposed on (or disposed to) the encoding disc 13 and respectively include a light source (such as a circular position) and two light sensors (such as a squared position) for detecting the rotation of the encoding disc 13 to generate the first position signal P1 and the second position signal P2. Moreover, apart from detecting the state of the encoding disc 13 (such as rotation or pollution), the first position detector 11 and the second position detector 12 can further perform dynamic self-monitoring. For example, the first position detector 11 and the second position detector 12 can output the first detection signal E1 and the second detection signal E2 according to whether the encoding disc 13 is damaged and the result of dynamic self-monitoring. The first position detector 11 and the second position detector 12 respectively includes a storage element, such as a register (not illustrated). The computation elements of the first position detector 11 and the second position detector 12 perform different logic computations on the signals detected by the first position detector 11 and the second position detector 12 to obtain different operation states, and further store the obtained operation states to respective registers. Thus, each register can store several data of normal or abnormal operation states. The operation state is such as the state of electric current, voltage or dirt, or the power supply state.

When the first detection signal E1 and the second detection signal E2 respectively are at a first level 1, this indicates that the first position detector 11, the second position detector 12 and the encoding disc 13 are in a normal state. When the first detection signal E1 and the second detection signal E2 are at a second level 0, this indicates that that the first position detector 11, the second position detector 12 and the encoding disc 13 are in an abnormal state. The difference between the first position signal P1 and the second position signal P2 indicates the rotation state of the encoding disc 13 (such as rotation angle); or, the first position signal P1 and the second position signal P2 both can indicate the rotation state of the encoding disc 13 and can vary with the type of the encoding disc 13.

Refer to FIG. 1 again. The first output port a, the second output port b, the third output port c and the fourth output port d are different output ports. Moreover, the encoding disc 13 can be regarded as a 360° disc (also referred as an optic disc). In an embodiment, the first position detector 11 and the second position detector 12 are separated by 70°. However, the first position detector 11 and the second position detector 12 can be separated by 180°, wherein the disposition of the first position detector 11 and the second position detector 12 can be adjusted according to actual needs and is not limited to the exemplification of the embodiment. Or, the resolution of the encoding disc 13 can be set to $2^{18}$ bits ($2^{18}$=262144 pulses/circle). Thus, the first position detector 11 and the second position detector 12 can be separated by about 262144*70/360≈51000 pulses or 262144*180/360≈130000 pulses, and the said arrangement is a candidate design item.

Figure 2:
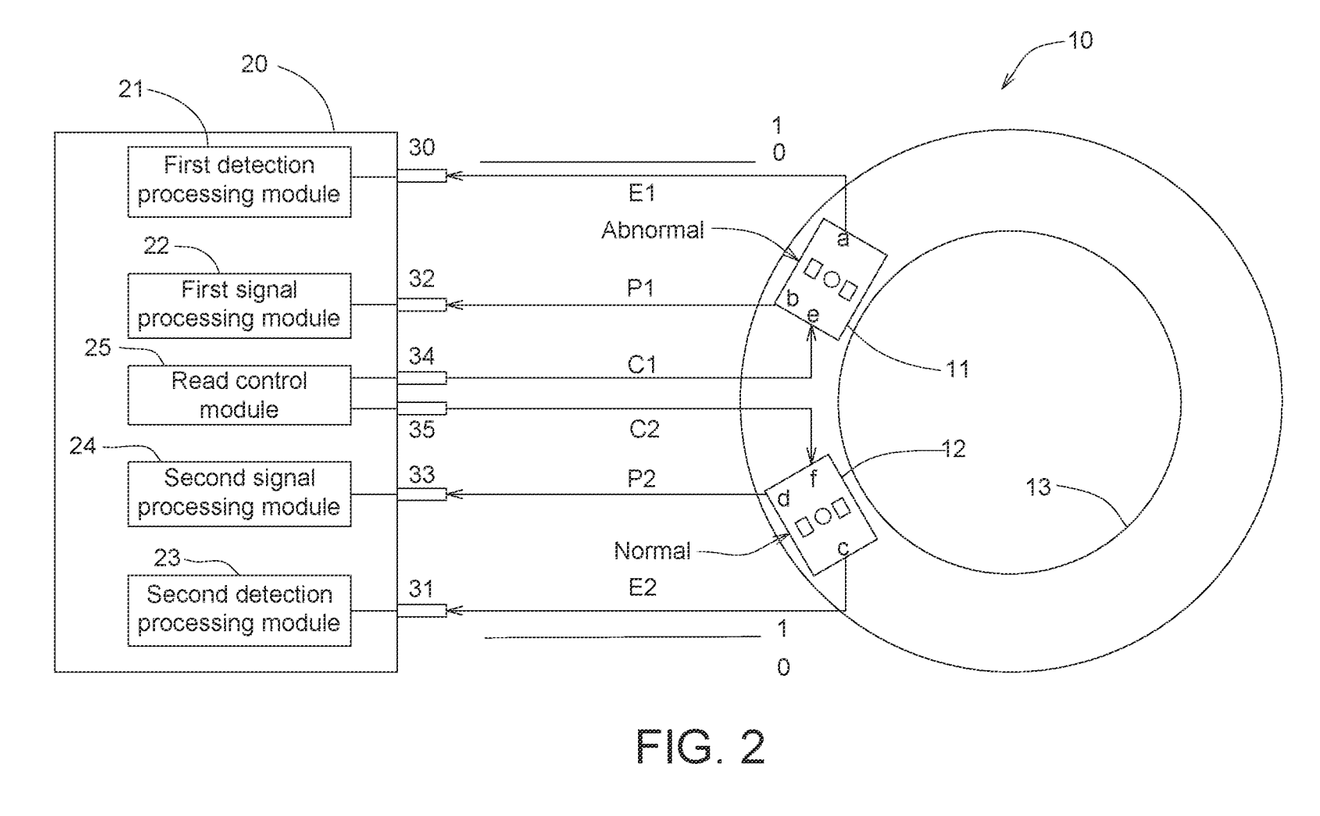
FIG. 2 is an abnormality diagram of a first position detector of a position detection module according to the present invention.
Figure 3:
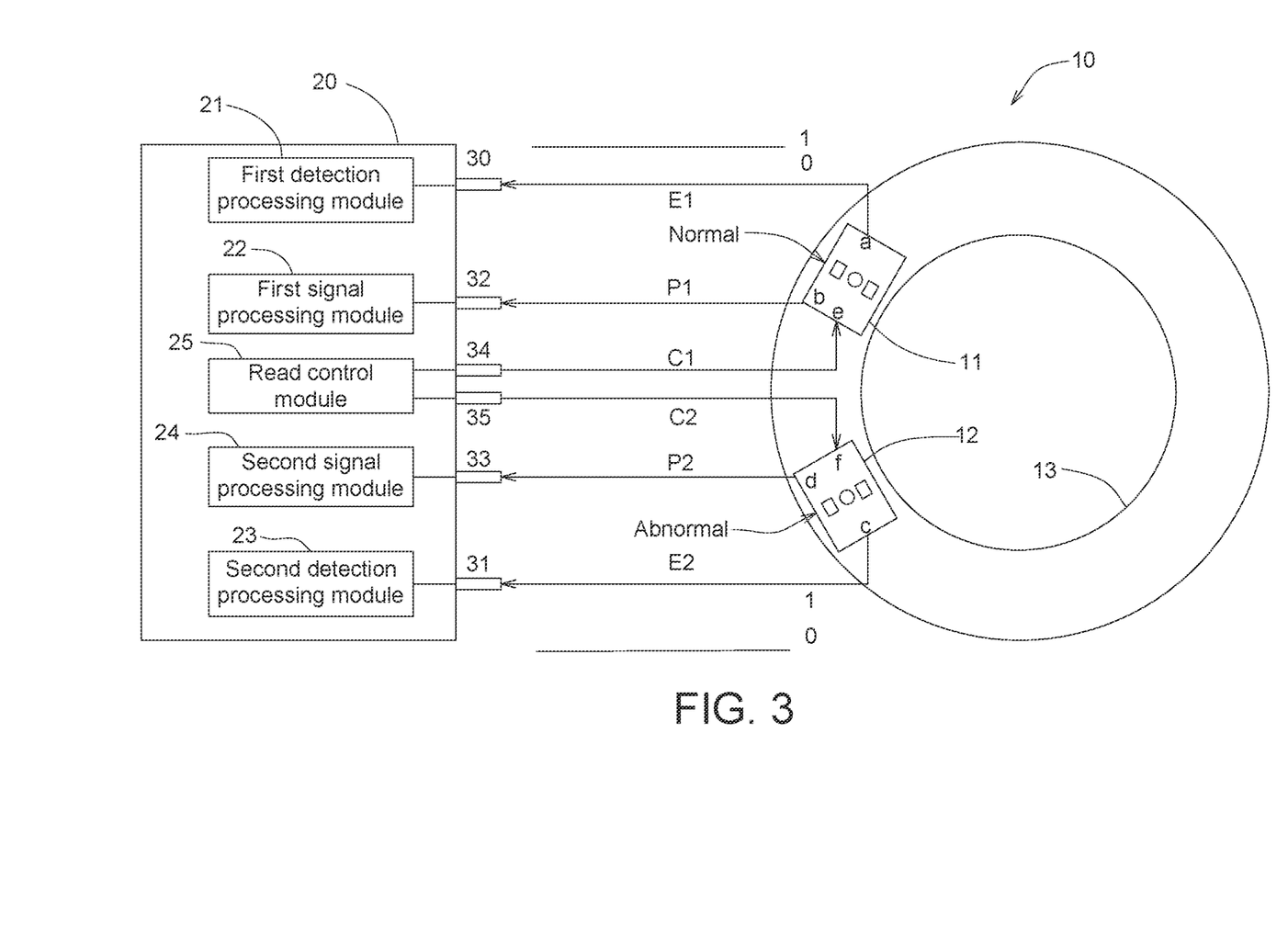
FIG. 3 is an abnormality diagram of a second position detector of a position detection module according to the present invention.

Given that the position detection module 10 is provided a fault-tolerant design, when the first detection signal E1 and the second detection signal E2 are at the first level 1, the first position detector 11 or the second position detector 12 can be selectively enabled. Referring to FIG. 2, an abnormality diagram of a first position detector of a position detection module according to the present invention is shown. As indicated in the diagram, when the first detection signal E1 is at the second level 0 and the second detection signal E2 is at the first level 1, the first position detector 11 is disabled and the second position detector 12 is enabled, such that the operation of the production line or the robotic arm can continue. Referring to FIG. 3, an abnormality diagram of a second position detector of a position detection module according to the present invention is shown. As indicated in the diagram, when the first detection signal E1 is at the first level 1 and the second detection signal E2 is at the second level 0, the first position detector 12 is enabled and the second position detector is disabled. In other words, the safe dual-channel (two sets of position detectors 11 and 12) position detection module 10 and the position detection system thereof do not have to be halted abruptly, and the probability of peripheral elements being damaged can be reduced.

Figure 4:
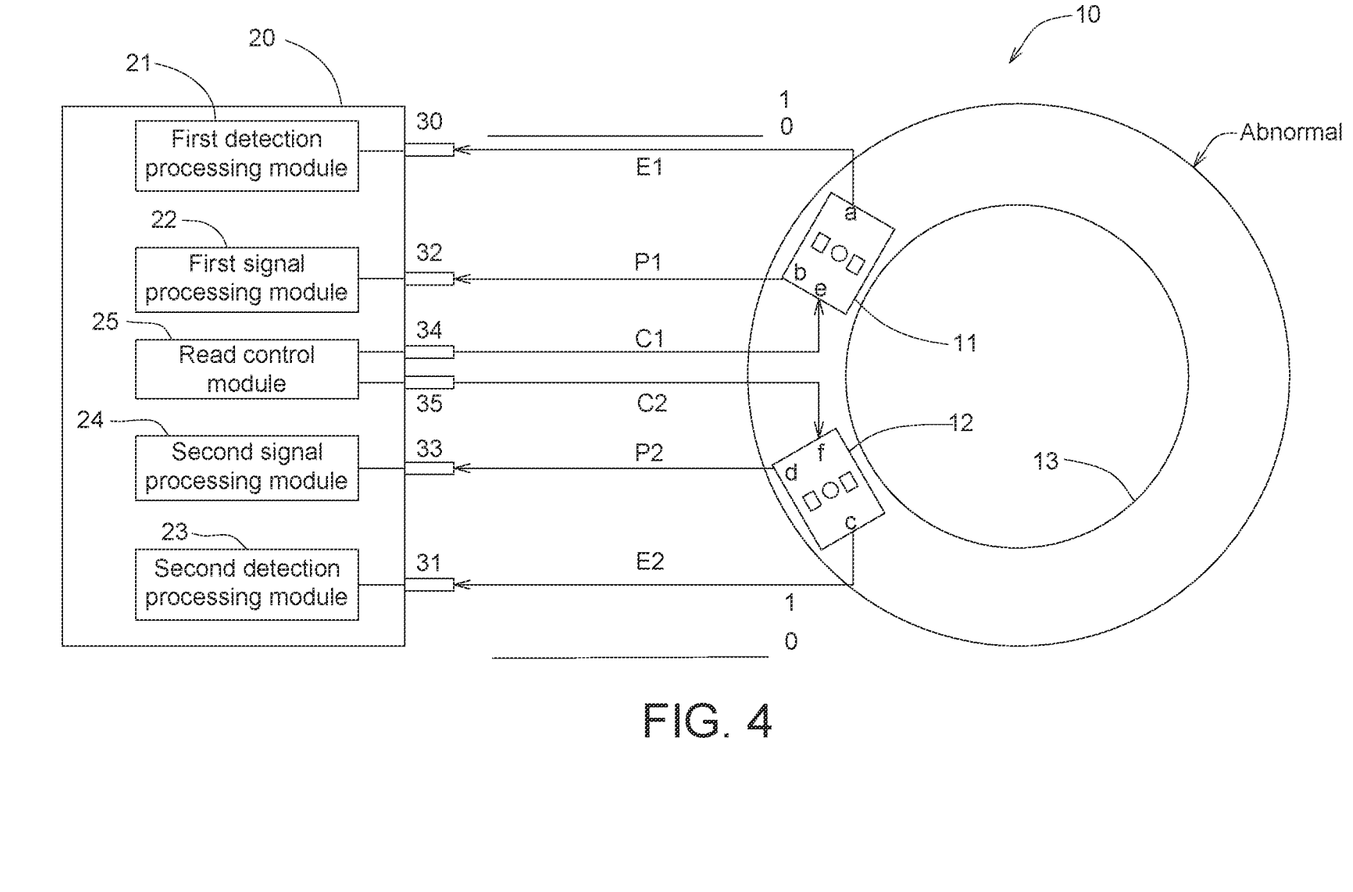
FIG. 4 is an abnormality diagram of an encoding disc of a position detection module according to the present invention.

Referring to FIG. 4, an abnormality diagram of an encoding disc of a position detection module according to the present invention is shown. As indicated in the FIG. 4, after the first position detector 11 and the second position detector 12 detect the encoding disc 13, if the first detection signal E1 and the second detection signal E2 are detected to be at the second level 0 according to the logic computation related to the state of the encoding disc 13, this indicates that the first position detector 11 and the second position detector 12 both detect abnormality or several dirt spots of the encoding disc 13 has, and the encoding disc 13 needs to be halted for further examination or maintenance. Or, unlike the embodiment of FIG. 4, for example, if the computation shows that one of the first detection signal E1 and the second detection signal E2 is at the second level 0, this indicates that the abnormality of the encoding disc 13 is not severe, for example, the encoding disc 13 has only one dirt spot and the operation of the encoding disc 13 can continue.

Figure 5:
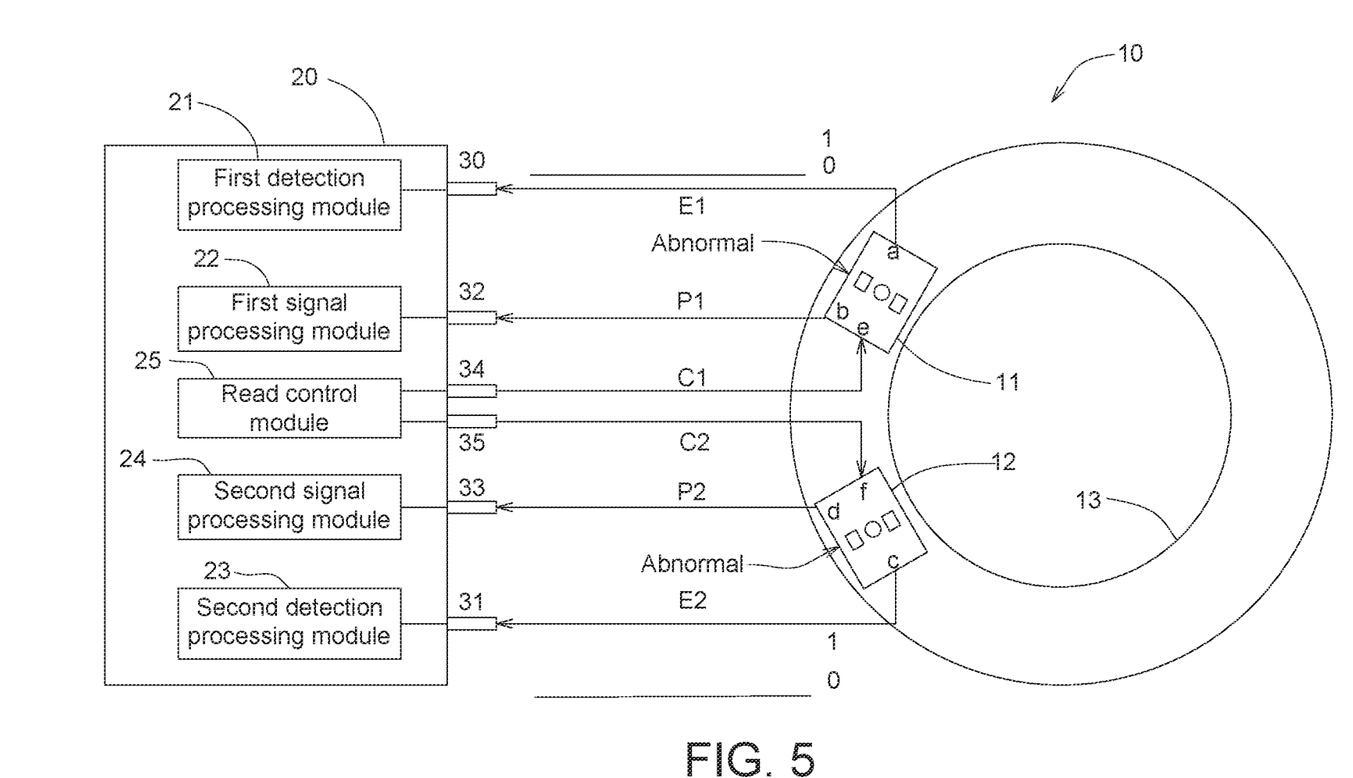
FIG. 5 is an abnormality diagram of a first position detector and a second position detector according to the present invention.

Referring to FIG. 5, an abnormality diagram of a first position detector and a second position detector according to the present invention is shown. As indicated in the FIG. 5, after the first position detector 11 and the second position detector 12 detect the encoding disc 13, if the first detection signal E1 and the second detection signal E2 are detected to be at the second level 0 according to the logic computation related to the state of the position detectors, this indicates that the first position detector 11 and the second position detector 12 both detect (have) abnormality, and the system need to be halted for further examination or maintenance. Or, unlike the embodiment of FIG. 5, for example, if the computation shows that one of the first detection signal E1 and the second detection signal E2 is at the second level 0, this indicates that one of the position detectors 11 and 12 is normally, and the operation of the position detection module 10 can continue.

Refer to FIG. 1 to FIG. 5 again. The implementation of the micro-processor 20 is the same. The position detection module 10 and the micro-processor 20 are mutually coupled. The micro-processor 20 includes a first signal processing module 22, a second signal processing module 24, a first input pin 30, and a second input pin 31. The first signal processing module 22 and the second signal processing module 24 receive and process the first position signal P1 and the second position signal P2 respectively through the third input pin 32 and the fourth input pin 33 and perform a subsequent control procedure according to the rotation state of the encoding disc 13. The first input pin 30 and the second input pin 31 receive the first detection signal E1 and the second detection signal E2, respectively. Furthermore, the micro-processor 20 includes a first detection processing module 21 and a second detection processing module 23 configured to process the first detection signal E1 and the second detection signal E2 respectively and send the detection result of the position detection system to the operator. In other words, the first and second position detectors 11 and 12 of the position detection system can detect the rotation of the encoding disc 13 to output the first and second position signals P1 and P2 and detect the state of the position detection module 10 to output the first and second detection signals E1 and E2.

Besides, the micro-processor 20 includes a read control module 25 coupled to the position detection module 10 for controlling the position detection module 10 to output the detection signals E1 and E2 which indicate other operation states. For example, the read control module 25 is coupled to the first position detector 11 and the second position detector 12 through the first output pin 34 and the second output pin 35. The read control module 25 generates a first control signal C1 and a second control signal C2 to the first position detector 11 and the second position detector 12 to control the register inside the position detection module 10 and provide the data of corresponding operation state. That is, when the read control module 25 controls the register to provide the detection result related to the position detectors 11 and 12, the first detection signal E1 and the second detection signal E2 outputted by the position detection module 1 relate to whether the position detectors 11 and 12 are in a normal state. When the read control module 25 controls the register to provide the detection result related to the encoding disc 13, the first detection signal E1 and the second detection signal E2 outputted by the position detection module 10 are related to whether the encoding disc 13 is over-polluted or over-damaged. Or, the read control module 25 can control the register to provide the detection result related to voltage value or current value. The above exemplification is a candidate design, and is not limited by the embodiments.

Figure 6:
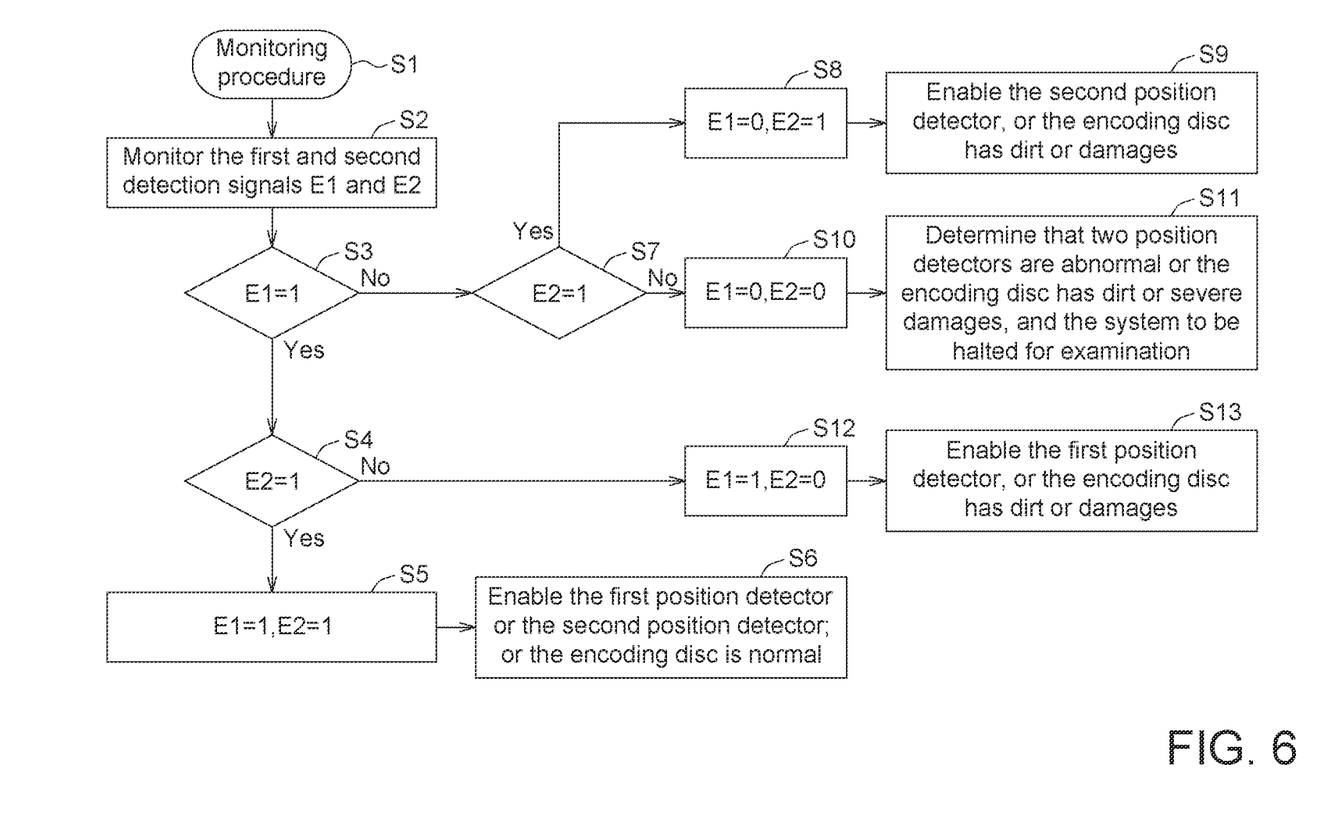
FIG. 6 is a flowchart of abnormality detection procedure of a position detection system according to the present invention.

Referring to FIG. 6, a flowchart of abnormality detection procedure of a position detection system according to the present invention is shown. As indicated in the FIG. 6, the procedure begins at step S1, a monitoring procedure is performed. In step S2, the first and second detection signals E1 and E2 are monitored by the micro-processor 20. In step S3, whether the first detection signal E1 generated by the first position detector 11 is at the first level 1 is determined by the micro-processor 20, and the procedure proceeds to step S4 if the determination is affirmative. In step S4, whether the second detection signal E2 generated by the second position detector 12 is at the first level 1 is determined by the micro-processor 20, the procedure proceeds to step S5 if the determination is affirmative. In step S5, the warning device (such as a display) indicates that the first position detector 11 and the second position detector 12 are in a normal state. By the same analogy, whether the several detection tracks of the encoding disc 13 are in a normal state can be determined. Then, the procedure proceeds to step S6. In step S6, the first position detector 11 or the second position detector 12 is selectively enabled by the operator through the micro-processor 20 to perform subsequent operations.

Moreover, in step S3, if the micro-processor 20 determines that the first detection signal E1 is at the second level 0, the procedure proceeds to step S7. In step S7, whether the second detection signal E2 is at the first level 1 is determined, and the procedure proceeds to step S8 if it is determined that the second detection signal E2 is at the first level 1. In step S8, the notification that the first position detector 11 is in an abnormal state and the second position detector 12 is in a normal state is sent through, and the procedure proceeds to step S9. In step S9, the second position detector 12 is enabled. By the same analogy, whether one/some of the detection tracks of the encoding disc 13 has/have dirt spots or damages can be determined, and the similarities are not repeated.

Or, in step S7, if the micro-processor 20 determines that the second detection signal E2 is at the second level 0, the procedure proceeds to step S10. In step S10, a warning is emitted and the notification that the two position detectors 11 and 12 are in an abnormal state is sent through, and the procedure proceeds to step S11. In step S11, the position detection module 10 cannot continue normal operation and has to be halted for maintenance. Similarly, when the encoding disc 13 is detected to have several dirt spots or severe damage, the system needs to be halted for examination.

Besides, in step S4, if the micro-processor 20 determines that the second detection signal E2 is not at the first level 1, the procedure proceeds to step S12. In step S12, the notification that the first position detector 11 is in a normal state and the second position detector 12 is in an abnormal state is sent through. In step S13, the first position detector 11 is enabled by the operator. Or, the operator obtains the situation that some of the detection tracks of the encoding disc 13 have dirt spots or damages.

The present invention provides a position detection module and a position detection system thereof. The position detection module includes a first output port, a second output port, a third output port, and a fourth output port. The first output port outputs a first detection signal, the second output port outputs a first position signal, the third output port outputs a second detection signal, and the fourth output port outputs a second position signal. Thus, the design of two sets of detection signals and position signals enables the position detection module to be fault-tolerant for meeting the requirements of safe dual-channel.

Moreover, the position detection system includes a position detection module and a micro-processor. The position detection module is coupled to the micro-processor. The micro-processor includes a first signal processing module, a second signal processing module, a first input pin, and a second input pin. The first signal processing module and the second signal processing module receive and process the first position signal and the second position signal, respectively. The first input pin and the second input pin receive the first detection signal and the second detection signal, respectively.

The micro-processor includes a read control module coupled to the position detection module for controlling the position detection module to output the detection signals indicating different operation states.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A position detection module, comprising:
   a first output port configured to output a first detection signal;
   a second output port configured to output a first position signal;
   a third output port configured to output a second detection signal; and
   a fourth output port configured to output a second position signal,
   a first position detector, comprising the first output port and the second output port, wherein the first position detector, disposed to an encoding disc, detects a rotation of the encoding disc to output the first position signal;
   a second position detector, comprising the third output port and the fourth output port, wherein the second position detector, disposed to the encoding disc, detects the rotation of the encoding disc to output the second position signal;
   wherein when the first detection signal and the second detection signal respectively are at a first level, this indicates that the first position detector and the second position detector are in a normal state; when the first detection signal and the second detection signal respectively are at a second level, this indicates that the first position detector and the second position detector are in an abnormal state; a difference between the first position signal and the second position signal indicates the rotation state of the encoding disc.

2. The position detection module according to claim 1, comprising:
   a first position detector, comprising the first output port and the second output port configured to output the first detection signal and the first position signal respectively; and
   a second position detector, comprising the third output port and the fourth output port configured to output the second detection signal and the second position signal, respectively.

3. The position detection module according to claim 2, wherein, the first position detector and the second position detector are separated by 70 degrees or 180 degrees.

4. The position detection module according to claim 1, wherein
   the first position detector detects a state of the position detection module to output the first detection signal; and
   the second position detector detects the state of the position detection module to output the second detection signal.

5. The position detection module according to claim 1, wherein the first position detector and the second position detector are separated by a period of about 51000 or 130000 pulses.

6. The position detection module according to claim 1, wherein, when the first detection signal and the second detection signal are in the first level, the first position detector or the second position detector is enabled; when the first detection signal is at the first level and the second detection signal is at the second level, the first position detector is enabled and the second position detector is disabled; when the first detection signal is at the second level and the second detection signal is at the first level, the second position detector is enabled and the first position detector disabled.

7. The position detection module according to claim 1, wherein, the first output port, the second output port, the third output port and the fourth output port are different output ports.

8. The position detection module according to claim 1, wherein, the position detection module is coupled to a micro-processor, the micro-processor comprises a first signal processing module, a second signal processing module, a first input pin and a second input pin; the first signal processing module and the second signal processing module receive and process the first position signal and the second position signal respectively; the first input pin and the second input pin receive the first detection signal and the second detection signal, respectively.

9. The position detection module according to claim 8, wherein the micro-processor comprises a read control module coupled to the position detection module for controlling the position detection module to output the detection signals indicating different operation states.

* * * * *